United States Patent [19]

Hird

[11] Patent Number: 4,535,415

[45] Date of Patent: * Aug. 13, 1985

[54] MEASUREMENT CONVERSION AND VISUAL DISPLAY INSTRUMENT

[76] Inventor: Edwin A. Hird, 10200 DeSoto Ave. #331, Chatsworth, Calif. 91311

[*] Notice: The portion of the term of this patent subsequent to Dec. 6, 2000 has been disclaimed.

[21] Appl. No.: 702,745

[22] Filed: Jul. 6, 1976

[51] Int. Cl.³ ............................................... G01B 3/08
[52] U.S. Cl. .................................... 364/562; 364/561; 377/18; 33/140
[58] Field of Search ........................ 235/151.32, 154; 73/431, 432 R; 33/125 R, 125 B, 126.6, 137 R, 137 L, 138–140; 364/561, 562; 377/18

[56] References Cited

U.S. PATENT DOCUMENTS

| 2,824,374 | 2/1958 | Abrams et al. | 33/140 |
| 3,271,564 | 9/1966 | Rosenfeld et al. | 33/140 |
| 3,780,440 | 12/1973 | Taylor | 33/139 |
| 3,801,803 | 4/1974 | McDaniel | 235/154 |
| 3,955,073 | 5/1976 | Carew et al. | 235/151.32 |
| 4,031,360 | 6/1977 | Soule, Jr. | 33/139 |

FOREIGN PATENT DOCUMENTS 1472454 1/1967 France ................................. 33/139

Primary Examiner—Gary Chin

[57] ABSTRACT

A compact measuring instrument having an extensible measuring means connected to accurately input a signal to a potentiometer, that signal being representative of a distance over which the extensible measuring means has extended, a calculator logic circuit being connected to the potentiometer to receive an output signal therefrom and convert it to a proportional measurement, and connected to transmit the proportional measurement signal to a visual electronic readout unit.

18 Claims, 24 Drawing Figures

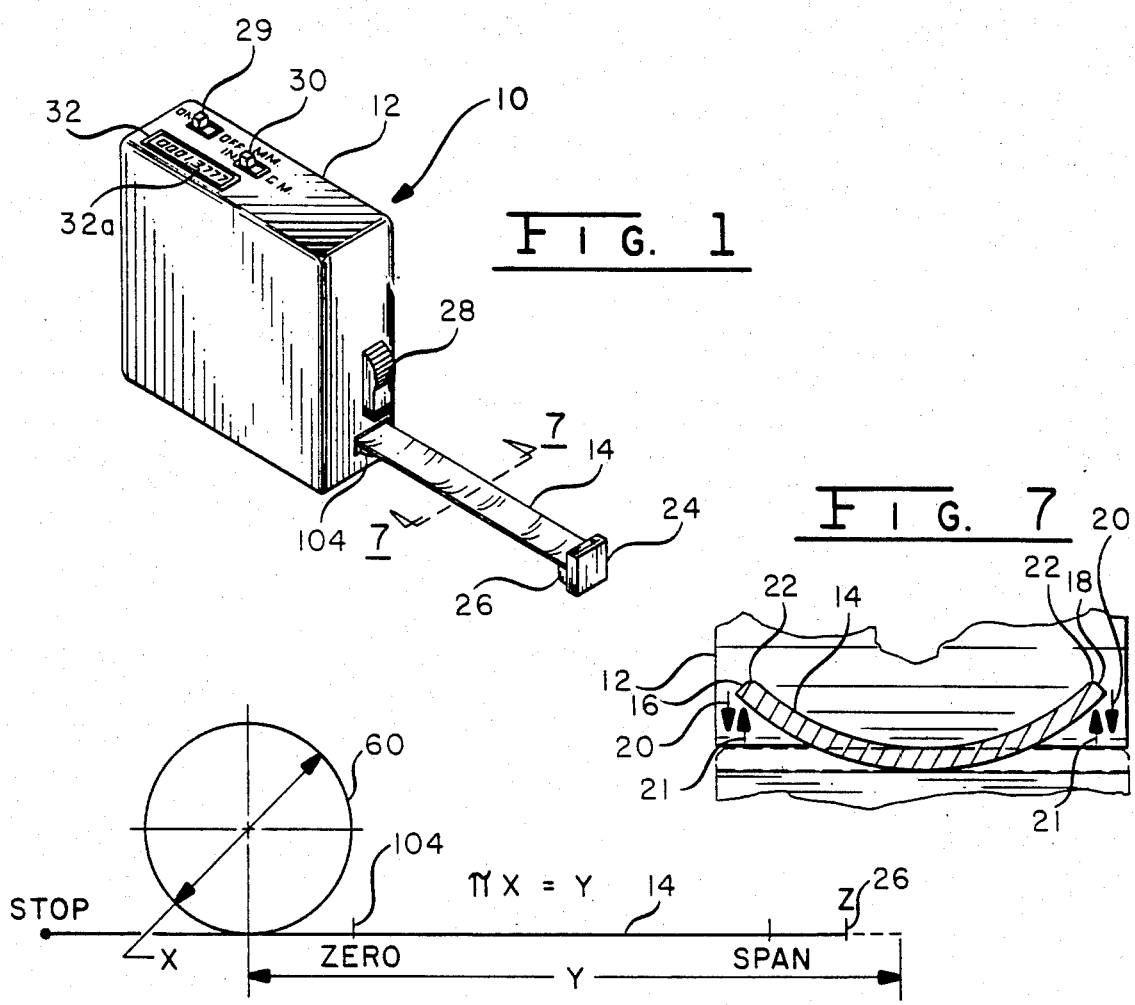
FIG. 1
FIG. 7
FIG. 2
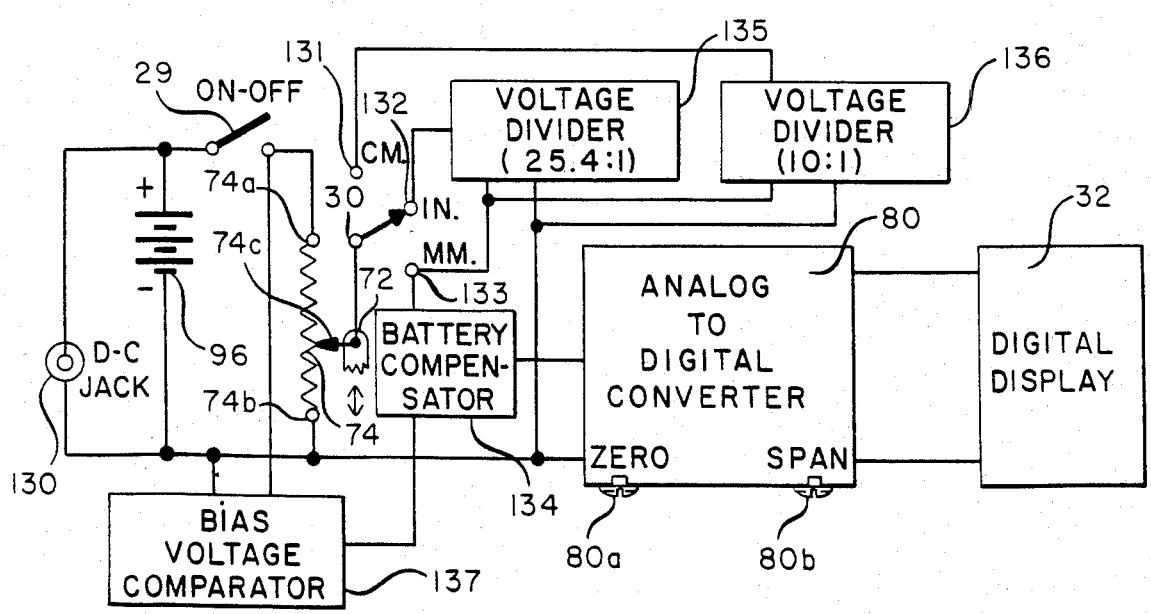
FIG. 3

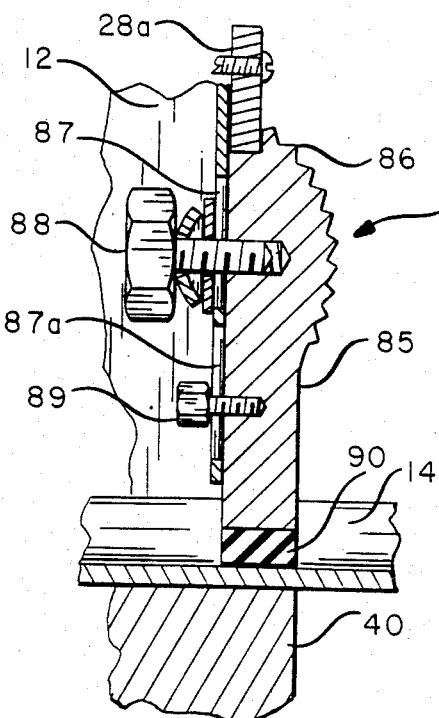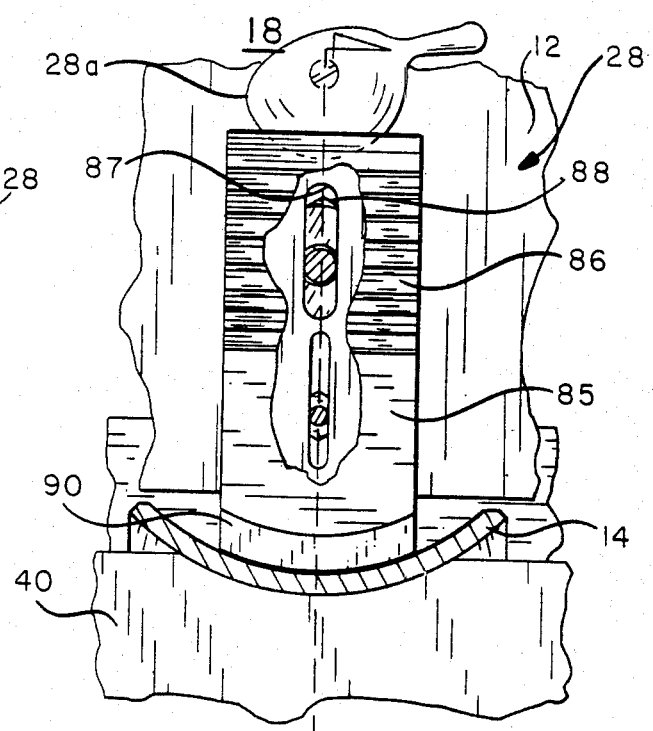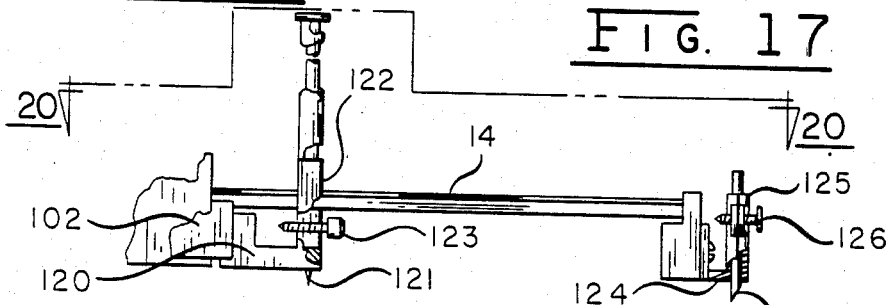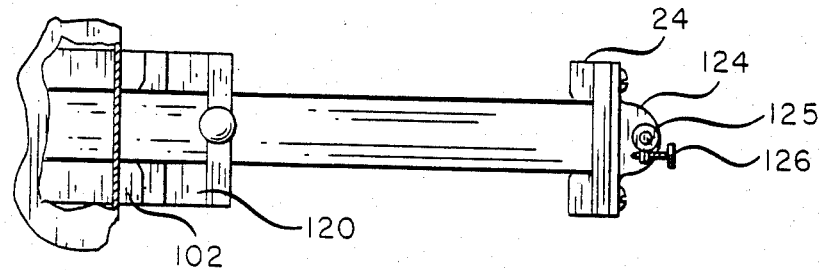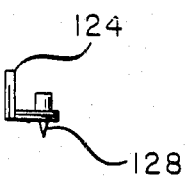

MEASUREMENT CONVERSION AND VISUAL DISPLAY INSTRUMENT

BACKGROUND

There has been a long standing requirement, virtually throughout industry, for a measuring instrument which is compact and easily usable, and which additionally has the capability of measuring directly a given distance in one measurement language and converting that measurement into another proportional measurement language. Such measurement, for example, may be in the metric system, some other system of measurement, or it may be simply a proportional part of the system within which the original measurement was taken.

This capability has become increasingly important as the drive to convert other systems of measurement to the metric system has gained momentum. Thus, as industry continues to progress in its conversion from one system to another the ability to obtain readings of the nature indicated will become increasingly more significant. Indeed, it is anticipated that a measurement conversion device such as is described and claimed herein will ultimately become a tool which is virtually mandatory for anyone working in the United States measurement system, since it will be necessary to recite such measurements in the metric system. In many instances the reverse will also be true.

Although a considerable amount of work has been accomplished in the general field of measurement conversion, no one has yet provided for the general market a device such as contemplated herein.

Developments such as that described in U.S. Pat. No. 3,801,803 have approached the solution to this problem by providing a system for machine tool equipment in the numerical control field, converting signals from a punched tape in the metric system to the U.S. system. While this approach provided an electronic means to accomplish the conversion, no attempt was made to introduce a complete analog-to-digital system into a compact unit wherein a direct linear measurement, for example, could be immediately translated or converted and displayed as a visual readout in one or more different proportions or different measurement systems, such as is accomplished by the present invention.

Digital systems of the kind represented by U.S. Pat. Nos. 3,780,440, 3,271,564, and 3,526,890 have also approached this system but have been limited in various particulars, particularly in their inability to handle analog information and are, therefore, limited in accuracy to the number of pulses per measurement unit.

BRIEF DESCRIPTION OF THE INVENTION

The invention relates to a measuring instrument encased in a housing having, in its preferred embodiment, the general appearance of a conventional steel rule tape. An extensible measuring unit, usually in the form of a conventionally curved steel tape wound upon a reel, which is normally spring-loaded, is extensible outwardly from the case to provide an accurate means for measuring between two given points.

An electrical switch, battery connected, is turned on and a second switch is similarly actuated to select the systems of measurement from which and to which the measure of distance is to be related. The tape is withdrawn from the reel, the distance is measured in one measurement system, converted as necessary, and instantly displayed digitally in the same or a second measurement system.

In general, when the tape is moved from its reel it traverses a roller system having non-slip characteristics, causing those rollers to turn. One of such rollers rotates an accurately calibrated potentiometer which produces an electric signal proportional to the distance measured. This signal is fed to a printed circuit board containing a calculator circuit capable of transposing or converting the signal to a second selected measurement system. A signal proportional to the measured distance, but in a selected secondary measurement system is fed to a digital readout to visually display the measurement in the secondary system. Thus, when a measurement is obtained, the readout may be displayed directly in inches or feet, or as an accurate proportion in a metric reading or vice versa.

In view of the foregoing it will be recognized that a primary objective of this invention is to provide a means which is simple of construction, compact and easily usable to take a direct measurement in a first system of measurement and provide a visual readout of that measurement, or to convert a signal responsive to such measurement into a second system of measurement and display the resulting proportional measurement directly in the visual readout.

Another object is to provide an extensible measuring device having means in conjunction therewith for accurately determining a particular distance and means associated with the measuring means internally of the housing for engaging the measuring means in a non-skid manner so as to prevent the introduction of error into the system by virtue of slippage between such engaging means and the measuring means.

Another object is to provide a method for accurately "setting" the instrument of this invention so as to take maximum advantage of an accurate measurement standard.

A further object is to provide stop means for the tape so that it can be accurately retained in any given position, once a measurement is obtained.

Further objects of invention will be recognized as including within the circuit of the system voltage dividers to provide selectivity of measuring systems, a bias voltage comparator and a battery compensator to provide for accuracy of measurement irrespective of the charge status of the battery.

Other objects of invention will be recognized upon examination of the accompanying specification, drawings and claims.

BRIEF DESCRIPTION OF THE DRAWINGS

FIG. 1 is a perspective view of the principal product of this invention for transposing one form of measurement into another in response to a direct linear measurement;

FIG. 2 is a schematic representation of a scale portion of the invention indicating the calibration principle;

FIG. 3 is a schematic of a typical electronic circuit of the invention;

FIG. 7 is an enlarged section of the scale, taken along line 7—7 of FIG. 1;

FIG. 17 is a front elevational view illustrating a scale stop;

FIG. 18 is a sectional view taken along line 18—18 of FIG. 17;

FIG. 19 is an elevational view in partial section illustrating a compass configuration in combination with the scale;

FIG. 20 is a top view taken along line 20—20 of FIG. 19;

FIG. 21 is a view showing a scribe point usable with the embodiment of FIGS. 19 and 20;

DETAILED DESCRIPTION OF THE DRAWINGS

Figure 4:
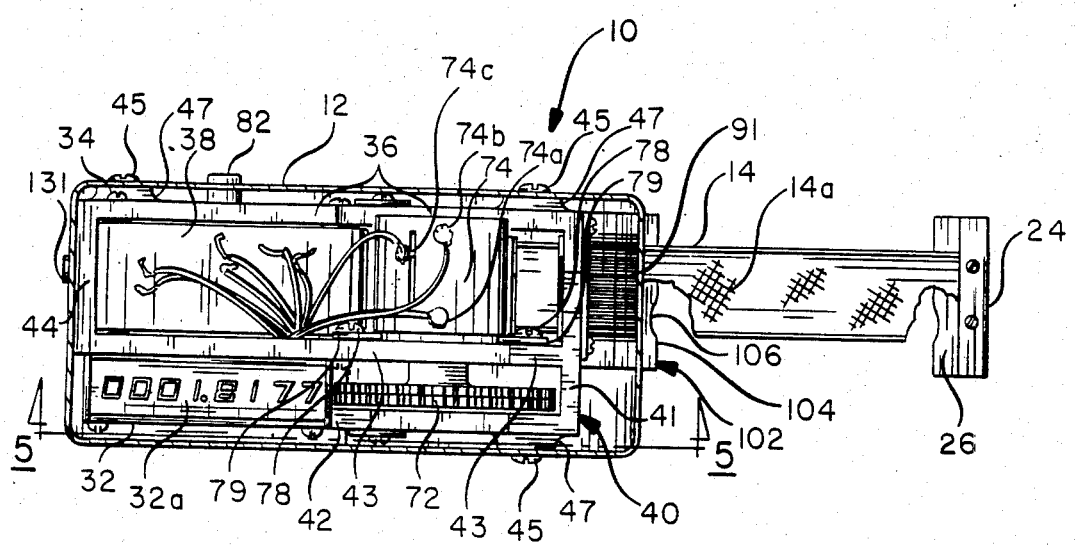
FIG. 4 is a top view in section of the FIG. 1 device, partially cut away to better illustrate certain details of the features.
Figure 5:
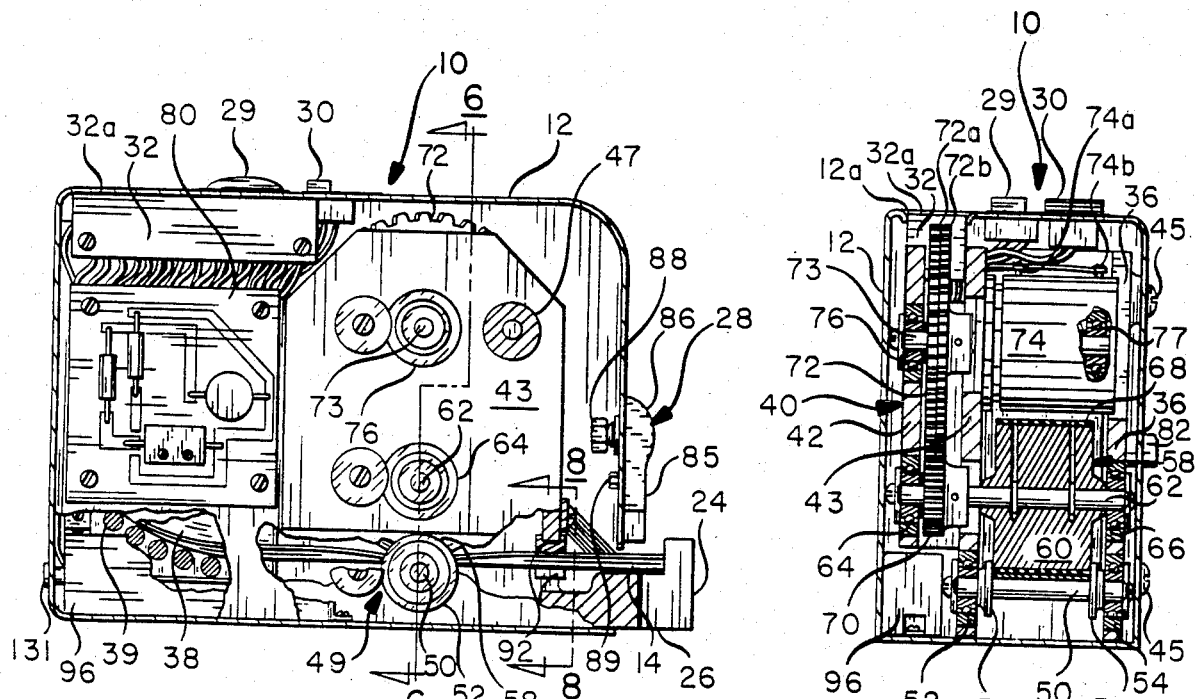
FIG. 5 is a sectional elevational view taken along 5—5 of FIG. 4.
Figure 6:
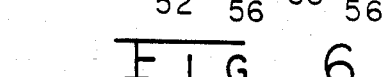
FIG. 6 is a sectional view taken along line 6—6 of FIG. 5.

The measuring device of this invention is generally illustrated in a typical, preferred configuration in FIG. 1, cutaways and sections thereof being additionally illustrated in FIGS. 4–6. Therein, the overall measuring instrument is indicated by the numeral 10. It is provided with a box-like housing 12 reminiscent in shape of a standard steel rule case. Extending from the housing 12 is an extensible measuring scale 14 in the form and shape of a conventional steel rule tape. The tape is curved in cross section, best illustrated in FIG. 7. This curvature may be modified or flattened by the application of force to the edges 16 and 18 in the direction of the arrows 20 for a purpose to be later described. When so flattened, the tape 14 normally tends to return to its curved position in the direction of arrows 21 by virtue of a built-in spring factor. As in conventional tapes of this character, this feature tends to stiffen and straighten the tape 14, thereby facilitating an accuracy of measurement not inherent in measuring units of other configurations. The upper corners of the tape 14, as indicated by numerals 22 may be chamfered for anti-chafing characteristics in relation to a drive member to be later described. In the context of this invention, extensible is intended to mean capable of being withdrawn or laid out to its total length, but being non-stretchable.

Affixed to the outer extremity of the tape 14 is a tip member 24 having a contact portion 26 for forcibly contacting or for sighting across a point to be measured. Such contact or sighting portions are further described with respect to FIGS. 13–16, 19 and 20.

A tape stop 28, described in detail in relation to FIGS. 17 and 18, is included upon the housing 12 adjacent to the tape 14.

An on-off switch 29 and a measurement selection switch 30 is provided on the top of the housing 12.

Usually adjacent the switches, but locatable at any other desired position, is a digital readout device 32 having a visual display 32a. Commercially available LED's or other readout devices, preferably including eight digits with a floating decimal, have been found highly acceptable for this purpose.

Contained within the housing 12 are a plurality of components arranged in an orderly fashion consistent with the particular housing configuration selected. In the present instance, the orientation of the components is designed for best compatibility with the configuration illustrated.

Secured internally of the housing 12 by a screw 34 to a support wall 36 is a conventional tape reel 38, usually but not mandatorily spring-loaded, having the tape 14 wrapped therearound so as to be normally biased in the wrapped, wound or retracted condition. The tape 14 may be of any desired length consistent with the designed characteristics of a particular measuring instrument. It is sometimes mounted on guide rollers 39 for ease and direction of movement.

Retained within and fixed to the housing 12 is a support bracket 40 having a cross member 41 and a plurality of upstanding, and usually parallel, walls 42, 43, a rearward wall 44, and the previously identified wall 36. The bracket 40 is retained in its fixed position by the screws 45 which extend through the housing 12 and into bosses 47 which are formed integrally with the support bracket 40. In the usual case the support bracket 40 is made from molded aluminum or molded plastic.

It is important to proper operability of the measuring instrument that the tape 14 be accurately monitored in its movement so as to accurately record each increment of such movement. To this end a tape follower means 49 is provided, assuring that no tape movement occurs without its being properly registered. Thus, any slippage of the tape relative to recording components must be guarded against and obviated to assure that proper recordation is accomplished. The tape follower means generally comprises a pair of rollers between which the tape 14 passes in a frictionized manner so as to prevent any such slippage. A first roller 50 is supported transversely of the support bracket 40 in a lower extremity of the support bracket 40 between the walls 43 and 36. The extremities of the roller 50 are mounted in a pair of ball bearings 52 and 54 within the respective walls, and separate flange members 56 are provided being positioned upon the roller 50 adjacent each of the bearings and being spaced a distance sufficient to accept with only a small tolerance therebetween the tape 14 when that tape is in a flattened condition. These flanges 56 also serve as inner race retainers for the bearings.

Mounted above the roller 50 is a second roller 58 having a body portion 60 fixed concentrically about a shaft 62. The body 60 is positioned between the support bracket walls 43 and 36 with the shaft ends mounted in a pair of bearings 64 and 66 retained in the walls 42 and 36. This second roller 58 includes friction means, usually in the form of a layer of elastomeric material appropriately bonded to its surface. The diameters and the spacing of the rollers 50 and 58 are such that distance from zero to slightly less than the thickness of the tape 14 exists therebetween and the width of the roller 58 is such that its periphery nests in a loose fit between the two flange members 56. The two rollers are capable of mutual rotation without interfering with one another. However, when the tape 14 is inserted between the two rollers a definite frictional engagement of the tape by the rollers is present, the elastomeric layer 68 being compressed slightly to accept the thickness of the tape 14. This accommodates a frictionization of the tape sufficient to prevent it from being moved unless the roller 58 rotates simultaneously.

Irrespective of the foregoing, additional frictioninducing means is provided. In order for the normally curved tape 14 to fit between the rollers, it must be straightened out or flattened. The aforementioned chamfers 22 on the edges of the tape 14 accommodate this tape flattening without those edges unduly gouging or digging into, and thereby destroying, the relatively smooth character of the elastomeric layer 68. The resulting spring force which is applied to the rollers responsive to this tape straightening increases the frictional engagement of these components to further obviate slippage. Additionally, the upper surface 14a of the tape 14 is sometimes knurled, as illustrated in FIG. 4, providing an even more effective frictionization.

Alternative means of tape engagement will be later described.

Attached to an extremity of the shaft 62 between the bracket walls 42 and 43 and internally adjacent the bearing 64 is a pinion gear 70, mounted to rotate with the roller 58 and the shaft 62. The teeth of this gear engage and drive those of a second and larger spur gear 72 which is fixed to a shaft 73 of a potentiometer 74 having electric terminals 74a and 74b and a slide member 74c, the shaft being rotatable in a pair of bearings 76 and 77 respectively mounted in the frame wall 42 and a potentiometer housing. The potentiometer is supported upon the bracket wall 43 by a pair of screws 78 through a mounting flange 79.

Because of the importance of eliminating relative movement of the component parts in the invention, and thereby obviating errors in measurement, the driven gear 72 is usually an anti-backlash gear designed to eliminate backlash between the two gears 70 and 72. It is usually segmented, i.e., comprised of two flat, mated gear portions 72a and 72b, the teeth of which are slightly misaligned with one another to provide the anti-backlash capability.

The potentiometer terminals 74a and 74b have leads attached thereto which communicate with other components, as described below with respect to the schematic diagram of FIG. 3. The potentiometer is connected, for example, to an analog-to-digital converter means in the form of a printed circuit (PG) board or electronic chip 80 appropriately affixed to the upstanding wall 43. This converter or calculator is conventionally constructed in accordance with known electronic principles to convert a voltage representative of a first measured distance into a digital signal capable of being displayed as numbers in a digital visual readout and, with the use of voltage dividers, converting that distance to a proportional distance in the same or another measurement system. As previously indicated, this circuit may be designed to convert the reading obtained by the movement of the tape 14, via a signal through the potentiometer 74, from the U.S. system of measurement in inches, for example, into a different proportional measurement within that same system, such as feet or into some other systems of measurements such as the metric system, such as millimeters, centimeters, meters, etc.

It will be understood, therefore, that the intent of this invention is to facilitate such a conversion of the reading irrespective of the particular systems involved, either in relation to the distance measured by the tape 14 or the conversion factor included in the PC board 80.

The specific electronic components illustrated in FIG. 5, as positioned upon the PC board 80, are representative only for illustrative purposes. Electrically connected to the PC board 80 is the aforementioned digital readout 32, also appropriately affixed to the wall 43, its readout face 32a being visibly displayed through an opening 12a in the upper surface of the housing 12 (FIG. 6).

The button 82 is a conventional release for the spring (not shown) tensioning the tape reel 38. When the spring release button 82 is pushed the rewind mechanism of the tape reel returns the tape 14 to the retracted position illustrated in FIG. 5.

Slideably mounted upon the front of the instrument housing 12 is a stop means 28, sometimes referred to as a tape stop. This tape stop means (best illustrated in FIGS. 17 and 18) generally comprises a slide member 85 knurled on a rounded surface 86. It is slideably retained in a slot 87 within the housing 12 by a retainer screw 88 and a guide screw 89 guided by a slot 87a such that an application of a downward force against the stop means forces an elastomeric layer 90 on a lower extremity of the slide member 85 into firm engagement with the upper surface of the tape 14, thereby stopping any further movement of the tape and locking it in place until such time as the stop means is released by a lock 28a.

Tape cleaner means in the form of a brush 91 is positioned to continuously wipe the upper surface of the tape 14, thereby preventing any undue accumulation of dirt and dust which could otherwise mar the roller surface.

A tape straightening or guide means is sometimes provided to assure that the tape will be restraightened to its horizontally straight shape after having been flattened by the follower, as well as properly positioning and guiding it as it enters and leaves the instrument casing. It may take the form of the small bracket 92, best illustrated in FIGS. 8 and 9, but additionally shown in cross section in FIG. 5. The bracket 92 is slotted, as at 93, for acceptance into the support bracket 40, basically as illustrated in FIG. 5. It includes a pair of legs 94 and an under-curved section 95 shaped to accept the tape 14 in its curved configuration. The insides of the legs 94 act as guide members for transverse guidance of the tape 14.

A battery 96 is located and appropriately retained in a lower extremity of the case 12. It is electrically connected into the system to provide power for the instrument.

Figures 8, 9, 10:
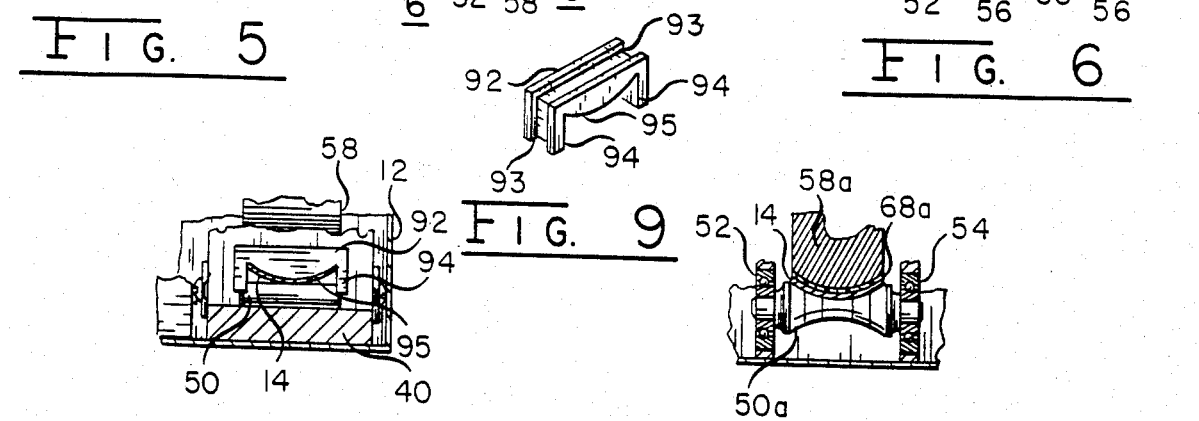
FIG. 8 is a partial section taken along line 8—8 of FIG. 5.
FIG. 9 is a perspective view of a scale guide.
FIG. 10 is a second embodiment of a scale guide roller.
Figure 11:
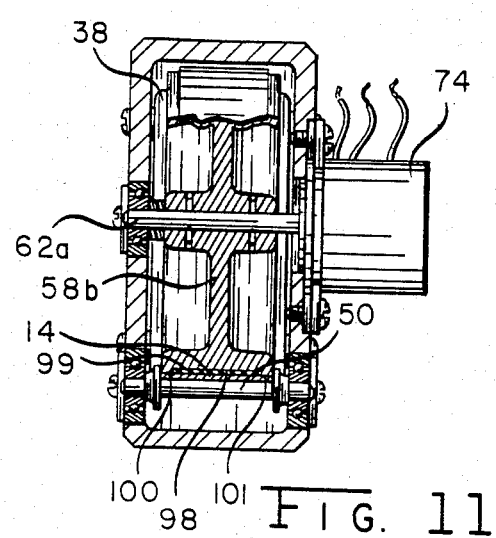
FIG. 11 is an elevational section of another embodiment of the potentiometer drive of the invention.
Figure 12:
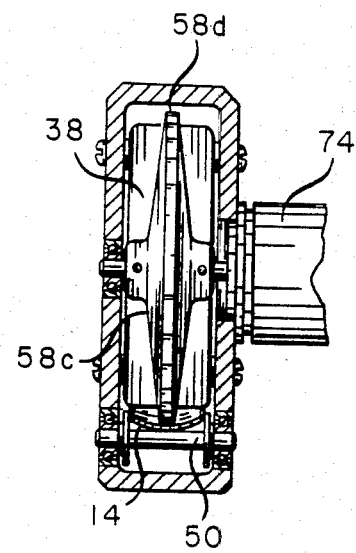
FIG. 12 is an elevational section of yet another embodiment of the potentiometer drive.

As previously indicated, it is of great importance that the means for driving the potentiometer responsive to tape movement be accomplished without slippage between the tape and the drive means, thereby eliminating the possibility of errors in translating tape movement into an accurate measurement. Thus, it is sometimes desirable to provide means alternative to that heretofore described for this function. FIGS. 10, 11 and 12 illustrate such alternative embodiments.

The means of FIG. 10, rather than including the tapeflattening rollers described with respect to FIGS. 4, 5 and 6, utilizes a curved roller 50a having a surface curved to match the curvature of the tape 14. The roller 58a has an elastomeric layer 68a and is similarly curved. Thus, the roller 58 and the tape 14 are oriented in a nested relationship with respect to the surface of the roller 50a. The roller is segmented such that each of its segments is capable of moving on the shaft independently of the others. Therefore, the curvature of the described components, which would normally require that there be slippage on some portions of the roller surface relative to the tape because of the relative diameters of the various roller portions, is largely compensated for to eliminate such slippage.

FIG. 11 illustrates an embodiment wherein the potentiometer drive wheel 58b drives the potentiometer 74 directly through the central drive shaft 62a without intermediate gears. The wheel 58b includes a peripheral annular channel 98 to accept a ring of elastomer 99 of greater thickness than the depth of the channel, that elastomer being compressible upon engagement with the tape 14 so as to provide a firm driving engagement with the roller 50, eliminating any slippage of the type noted. Additionally, the marginal metallic edges 100 and 101 of the wheel 50b are of a diameter sufficient to engage the edges of the tape 14, thereby forcing those edges downward into a flattened position. Since these edges engage the tape edges, the possibility of chafing the elastomeric layer 99 is eliminated.

Another embodiment is illustrated in FIG. 12. It shows a potentiometer drive wheel 58c of substantially the same diameter as the wheel 58b just described. However, in this instance the wheel has a tapered cross section with a region of minor cross section at the outer periphery 58d. The periphery is rubber coated as explained with respect to prior configurations. In this instance, the rubber coating of the wheel 58c engages the tape 14 approximately centrally of its curved cross section, forcing the tape firmly against the roller 50. This provides an engagement of the two rollers with the tape sufficient to accommodate the non-slip drive theretofore mentioned.

As shown with FIG. 4, the measuring instrument 10 sometimes includes in its lower extremity a contact member 102 adapted to be engaged by the tip member 24. The contact member 102 and contact portion 26 at times include a principal surface 104 and relieved regions 106 adjacent central rounded surfaces providing point contact between the two contact portions, giving greater accuracy. The flat portions of these members may be used as pencil or scribe guides.

Figure 13:
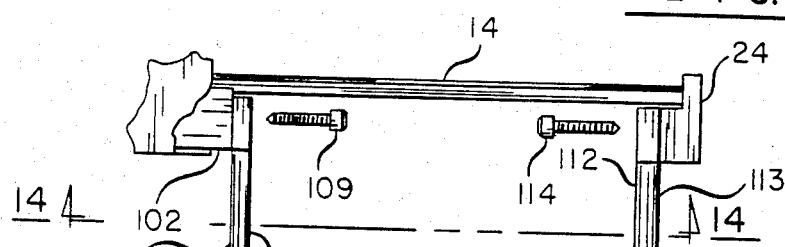
FIG. 13 is an elevational view of a typical scale, incorporating inside calipers.
Figure 14:
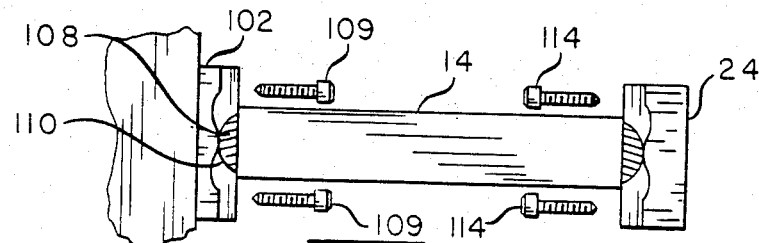
FIG. 14 is a sectional view taken along line 14—14 of FIG. 13.

It will be apparent that alternative means for accomplishing the specific measurement, insofar as the sighting member 102 and the tip member 24 are concerned, may be adapted to the specific nature of the measurement to be taken. For example, the members illustrated in FIGS. 13 and 14 are a pair of inside calipers wherein a first caliper member 108 is appropriately attached, as by screws 109, to the contact member 102 such that a measuring surface 110 is tangent to the principal surface of the contact member. A second caliper member 112 having a measuring surface 113 is similarly attached by screws 114 to the tip member 24, the members being thereby oriented such that the surface 110 of the first caliper member may be engaged against the internal surface of a cylinder, for example, and the surface 113 of the second master may be positioned against the opposite internal face of the cylinder. A true measurement responsive to the movement of the tape 14 is thereby obtained in the manner described above. The measuring surfaces 110 and 113 are usually curved, as illustrated in FIG. 14, for best accuracy of measurement.

Figure 15:
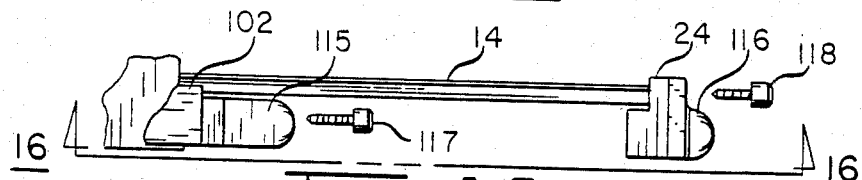
FIG. 15 is an elevational view of the scale, incorporating a depth gauge.
Figure 16:
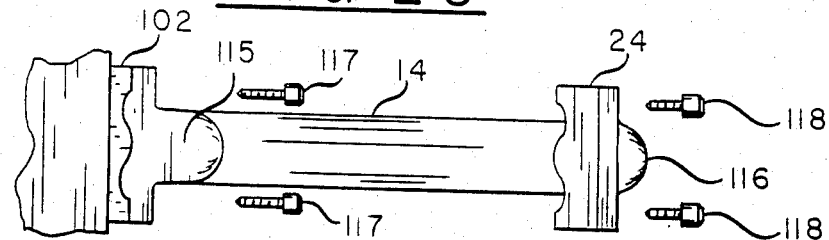
FIG. 16 is a bottom view of the scale of FIG. 15, taken along line 16—16.

The configuration illustrated in FIGS. 15 and 16 is an end point-to-end point measurement wherein contact members 115 and 116 are respectively attached to the contact member 102 and tip member 24 by the screws 117 and 118.

The embodiment illustrated in FIGS. 19, 20 and 21 is for purposes of using the instrument as a compass. In this instance a compass point support 120 is attached to the contact member 102 so as to hold a needle 121 for making contact as a first compass point. A frame 122 is shaped to reveive and guide the tape therethrough. The support 120 is retained by the screw 123. Similarly, a support 124 is attached to the tip member 24 to hold the lead or pen holder 125, having a tightening nut 126 positioned to tighten the holder relative to the lead or pen 127.

As illustrated in FIG. 21, a scribe point 128 may be similarly retained in the support 124.

With an apparatus of the nature indicated it is possible to provide a highly accurate measurement system whereby the distance between two points can be measured extremely accurately, even though the measurement is taken mechanically in the manner indicated. The accuracy of such measurement will accommodate any reasonable number of decimals. This accuracy is obtained by making a "factory set". It is accomplished by first closing the rule until the measuring points, such as the contact 102 and the tip member 24 contact one another. Since the potentiometer used in this instrument has an essentially infinite resolution, its absolute zero point is extremely difficult to locate when the contacts are closed. Therefore, with the contacts retained in this closed position, the potentiometer 74 retention screws 78 in the flanges 79 are loosened and the potentiometer 74 is rotated to its zero stop position. It is next rotated into its span rotation, usually approximately 10 degrees to obtain an electrical resistance reading. The screws are retightened such that the flanges 79 lock the potentiometer in position. The zero adjustment on the A-to-D converter 80 is then set such that the visual display 32 reads with all zeros showing and the zero adjustment screw is sealed, as by paint shellac, etc., to prevent the screw from loosening. The tape 14 is then extended a distance (in the usual case) of about 6 feet or 2 meters and measured to a U.S. Bureau of Standards' certified measurements of a steel bar having a specific length. The bar should have been given an official certification as to its length, calculated to whatever accuracy can be established. The material certification of the contact points on the measuring instrument, as well as that on the standard are taken into consideration in establishing this measurement. The bar identification should include the material certification of the bar, its expansion and contraction qualities, prevailing temperature and humidity conditions when certified, and any other pertinent information. The environmental conditions of the standard, when measured against the tape, should be as nearly the same, as wehn it was certified, as possible. The tape 14 is then used to measure this standard bar and the A-to-D span adjustment screw of the digital display is set to the exact measurement identified on the standard. Henceforth, any measurement taken with the instrument to the extent that they are taken under similar environmental conditions will be in precise proportion to the reading thus achieved, but in the specific measuring system selected to be displayed.

While it is understood that the measuring device can be designed for accomplishing measurements of any desired lengths, the specific design utilized in any particular instrument is usually characterized in terms of the length of the tape. Were it desired to provide a six or seven foot rule, for example, a configuration substantially as shown in FIGS. 1 and 4-6 could be utilized. In this instance a one inch drive wheel 58 drives a pinion which, in turn, drives an anti-backlash spur gear 72 having a 3:1 gear ratio. The anti-backlash gear 72 is attached to a ten turn (3600°+10°−0°) potentiometer with a shaft revolution life expectancy of 10 million revolutions. This configuration would allow the possibility to extend a tape from 0 inches at the principal surface 104 to about 94 inches ($\pi \times 3 \times 10$) whereby the potentiometer 74 would rotate from 0 degrees to its full run-out of 3600 degrees. Since damage could occur within the potentiometer if it were forced beyond full runout, the length of the tape is chosen in any particular configuration such that a measurement will be reached before the potentiometer's runout capacity is exhausted. With the tape length, from the principal surface 104, designed to extend approximately 6 feet (its overall physical length also including the internal length from the principal surface 104), then the potentiometer will rotate approximately 2757 degrees ($72.00 \times 3600 \div 94$). With the condition described, the potentiometer's rotations of 2757 degrees is well within the potentiometer's capability of 3600 degrees and the possibility of forcing it beyond runout cannot occur.

This feature is also semi-schematically illustrated in FIG. 2 wherein the tape 14 is fed under the drive wheel 58b of FIG. 11 or 58d of FIG. 12. The total potentiometer runout being indicated by the equation $\pi X = Y$ where X is the potentiometer's drive wheel diameter and Y is the potentiometer's total runout distance. The extremity to which the tape 14 is design-permitted to travel is indicated by Z, representing the contact portion 26 of the tip member 24 when the tape 14 is extended to its maximum extremity. The STOP represents the conventional tape stop 28 of tape 14. Thus, following zero adjust (principal surface 104) and span adjust (to an official U.S. measurement standard), the digital readout will display any proportional measurement as tape 14 is extended from ZERO (the principal surface 104) to Z (contact portion 26), and in any measurement system selected.

The philosophy of this measurement system differs from conventional measurement systems.

In conventional measurement systems, measurements are calculated by adding, subtracting, multiplying, or dividing increments, or graduations thereof. The present measurement system differs in that such conventional factors are only used as design parameters. An actual measurement when taken with this new and unique measuring instrument, is a direct proportion of an offical U.S. and, thus, world standard length and is instantly converted into any measurement language selected, and that conversion is numerically displayed. A schematic electrical diagram of the system is illustrated in FIG. 3. Therein, the on-off switch 29 is connected in series with a battery 96, the battery being connected in parallel with a DC jack 130. The other side of the switch 29 is connected to the potentiometer 74, the sliding contact 74c of that potentiometer being connected to the measurement selector switch 30. This switch may be alternately moved, for example, to a centimeter terminal 131, to an inches terminal 132, or to a millimeter terminal 133 for measurement system selectivity.

The negative terminal of the battery 95 is connected from the analog-to-digital converter 80. An electrical lead to this A-to-D converter runs through a battery compensator 134. Also a pair of voltage dividers 135 and 136, are connected to the A-to-D converter each such voltage divider being electrically connected back to an appropriate one of the terminals 131 and 132. The millimeter terminal 133 of the switch 30 is in the line leading directly from the battery, through the batery compensator, and to the A-to-D converter 80. The digital display 32 is electrically connected to the analog-to-digital converter 80 via a bias voltage comparator 137, which is connected in parallel with the battery 96 to compare any voltage loss resulting from prolonged use of the battery with the constant voltage requirements of the system. The bias voltage comparator 137 is connected, in turn, to the battery compensator 134 to compensate for any voltage drop. Thus, a substantially constant power signal is provided for the instrument throughout its operational life, thereby avoiding the probability of measurement errors from a variable battery charge. Operationally, were it desired to read a measurement taken by the tape 14 in millimeters, the switch 30 would be placed on the switch terminal 133, which is labeled in millimeters. Since the converter 80 is calibrated in millimeters, the measurement will be readout on the digital display 32 in millimeters. However, were it desired to obtain the display in centimeters or inches a switching would have to be accomplished.

To obtain the reading in centimeters, the switch 30 is moved to the centimeter terminal 131, thereby connecting it to the voltage divider 136, which divides the voltage by 10. Assuming the measurement taken by the tape 14 to be 150 mm, the reading on the digital display 32 would be 0015.0000, or 15 cm, since one centimeter represents ten millimeters and the voltage divider 136 has divided the voltage input to the display by ten.

A reading in inches, under the same circumstances, would be obtained by moving the switch 30 to the inches terminal 132, connecting it with the voltage divider 135, which divides the input to the digital display, via the converter, by 25.4. Since one inch represents 25.4 millimeters, the reading appearing on the digital display 32 would then be 0005.9055 inches, i.e., 150 (millimeters) divided by 25.4.

It will be understood that the two voltage dividers illustrated and described are representative only. Any number of such dividers, each including a different ratio, may be provided so long as a separate terminal on the switch 30 is provided to accommodate its connection to the converter 80.

Figure 22:
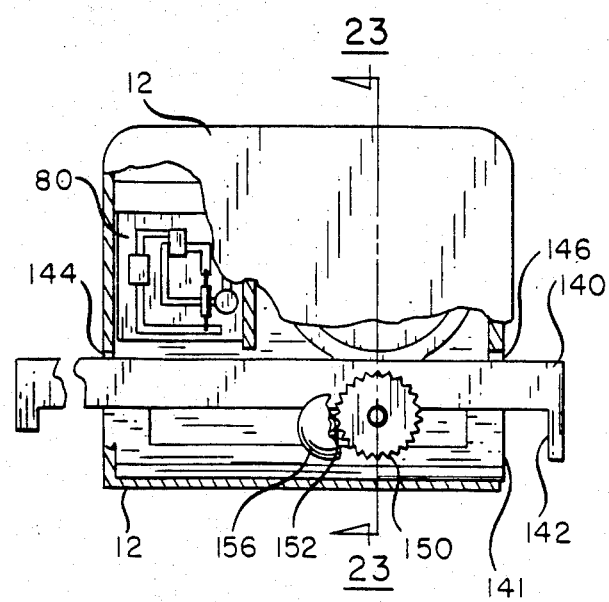
FIG. 22 is an elevational cutaway of an alternative embodiment of the inventive product having an inflexible scale and means to move it.
Figure 23:
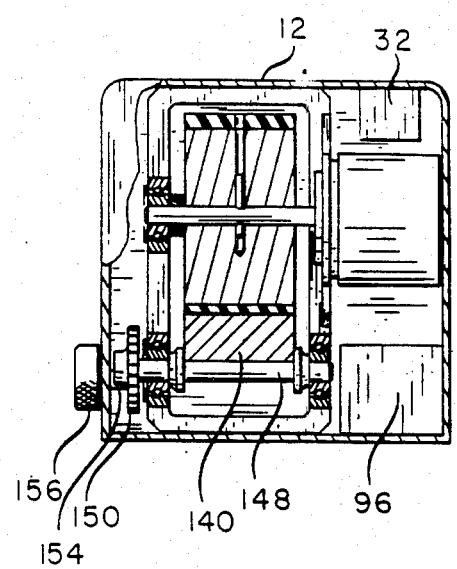
FIG. 23 is a sectional view taken along line 23—23 of FIG. 22.

In some instances it is desirable that a solid rule be provided for measurement purposes, rather than using a steel rule tape such as illustrated and described above. Thus, FIGS. 22 and 23 illustrate an embodiment of the instrument wherein a rule 140, in the form of a solid bar having an end measuring point 142, is mounted in the housing 12 so as to travel back and forth in that housing through housing openings 144 and 146. The rule 140 is hand driven or driven in its longitudinal movement by a drive shaft 148 via a spur gear 150 driven by a pinion gear 152. The gear 152 is connected through a shaft 154 to a knurled knob 156. Thus, a turning of the knurled knob 156 by the operator causes the rule 140 to move back and forth.

In this instance the illustrations of FIGS. 22 and 23 depict a 4:1 ratio between the pinion gear and the spur gear, and an approximate 10:1 ratio between the shaft 148 and the potentiometer drive wheel. This provides a 40:1 total ratio between the potentiometer and the knurled knob. This approach to establishment of the span adjustment is representatively illustrated in the curve of FIG. 24.

Figure 24:
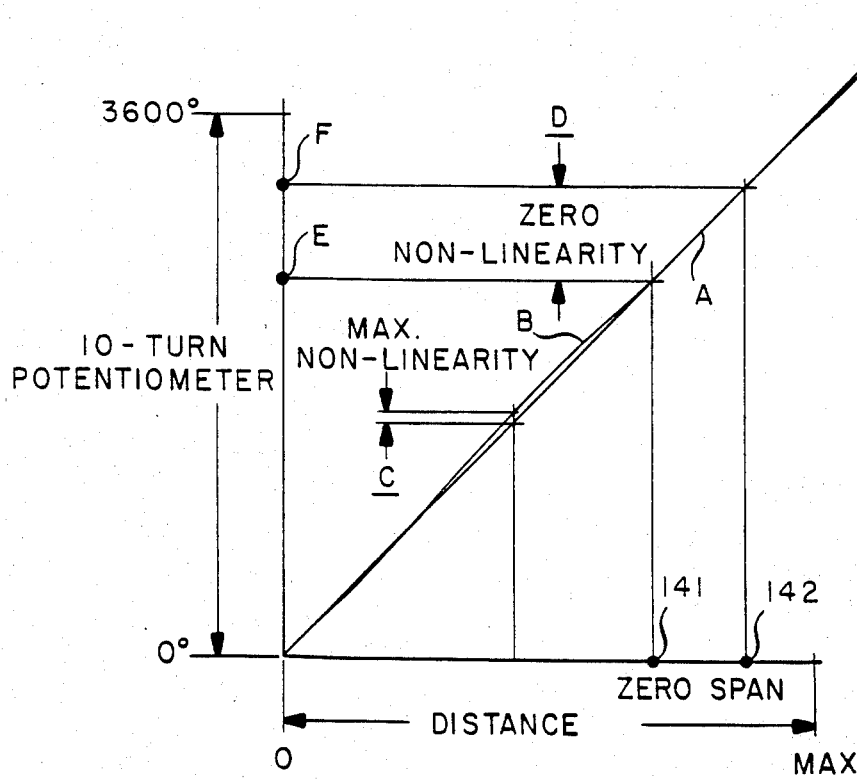
FIG. 24 is a curve, plotting distance against degrees for purposes of "setting" the instrument of FIGS. 23 and 24.

The abscissa in FIG. 24 indicates the distance from zero to the maximum length to be measured and the ordinate represents 3600° of potentiometer turn, i.e., 10 turns of the potentiometer. The ideal curve is represented as a straight line A. However, the actual linearity curve of a conventional potentiometer would follow an irregular straight and curved line such as indicated by A and B. A maximum non-linearity of this curve is shown by the distance C and a region of zero non-linearity is indicated by the distance D on the curve. Thus, it can be seen that if the measurement is established between the two points on the curve A represented by the zero non-linearity region, the ultimate readings taken and displayed by the instrument will be of extreme accuracy. The lower point on this zero linearity curve segment may be indicated as the zero adjust (as accomplished by an adjustment screw 80a in FIG. 3) and the outer point as the span adjust by screw 80b.

That regular portion of the curve used as the instrument "setting" is represented by the zero non-linearity area (D), i.e., the number of degrees from E to F on the ordinate, and the distance on the abscissa from the zero principal surface 141 to the span end measurement point 142. The span adjustment screw is set when the distance from the principal surface 141 to the end measurement point 142 is measured against an official measured length near the end of the potentiometer non-linearity distance. From that time onward, any measurement taken between the principal surface and the end measuring point 142, as the rule is extended to its stop, will be extremely accurate, as described. It is not necessary that the tape be numbered, since the readout device provides a direct numerical display of the measurement taken.

This procedure, in "setting" any particular potentiometer, is desirable in enabling the use of "off the shelf" potentiometers since most such potentiometers have some regions of linearity and some of non-linearity. The procedure described permits the manufacturer to use virtually all of his stock by the simple expedient of selecting for the readings only those portions of the potentiometer wire which are of zero non-linearity.

It will be recognized that by utilization of the principles and details described, and logical equivalents thereof, the objects of invention can be readily met. These principles and details are not to be considered as limiting, but only as representative of the invention described and claimed.

I claim:

1. A measurement conversion and visual display instrument comprising:
   an extensible and resilient tape being cross-sectionally curved defining tape concave and tape convex surfaces;
   a housing and tape follower, the housing having means mounting the tape follower consisting of first and second parallel rollers, the first roller having a firm periphery for transversely supporting the tape that is extensible from the housing, and the second roller having a rubberized periphery springily urging the tape against the first roller, and the second roller thereby rotating in response to the tape being longitudinally moved with respect to the housing;
   a tip member having means being attached to the extensible, distal end of the tape;
   a potentiometer mounted on the housing and connected across a voltage source, and the potentiometer including a rotatable shaft coupled whereby the potentiometer responds electrically, with analog signals, to movements of the tip member, and the tip member and the housing including measurement contact surfaces, and zero and span distances between said contact surfaces synchronized with national measurement standards; and
   calculator means electrically coupled to convert said analog signals to digital signals and mathematically specify units of measurements and portions thereof relative to the distances between said contact surfaces when the tip member is extended or retracted, and the calculator means including digital read-out means displaying said units of measurements and portions thereof.

2. The device of claim 1 wherein the first roller is segmented and shaped along its length to match the tape convex surface, the first roller thereby being divided into segments and each of the segments having independent rotation, and whereby the periphery of the second roller is shaped to match the tape concave surface.

3. The device of claim 1 wherein the first roller includes flange members to guide the sides of the cross-sectional curved width of the tape, and the second roller is reduced at its periphery to a contact surface with the tape generally along the longitudinal center of the tape.

4. The device of claim 1 wherein the first roller includes flange members to guide the width of the tape being laterally flattened by the second roller, and the second roller has a width contacting the tape, and the width corresponding to the width of the tape when laterally flattened.

5. The device of claim 4 wherein the second roller incorporates metallic edges around its periphery engaging and forcing downward into a flattened configuration the edges of the tape.

6. The device of claim 1 wherein the rotatable shaft is axially coupled with reducing gears, and whereby at least one of said reducing gears is an anti-backlash gear, and whereby the reducing gears, in turn, are axially coupled with the second roller.

7. The device of claim 1 wherein the rotatable shaft is axially connected with the second roller.

8. The device of claim 1 wherein the calculator includes means dividing the voltage of said analog signals into a plurality of voltages representative of a plurality of measuring systems, and the housing mounting a selector switch electrically connected with said calculator means, and the switch having a plurality of independent selections representative of said measuring systems.

9. The device of claim 8 further including an enclosure for receiving the tape as it is retracted, and means causing the tape as it is retracted to assume a coiled configuration within the enclosure.

10. The device of claim 9 further including a tape straightener mounted on the housing and positioning and guiding the tape being extended or retracted.

11. The device of claim 10 further including a tape stop mounted on the housing and having means locking the tape at any extendable position.

12. A measurement conversion and visual display instrument comprising:

a bar being extendable and having a tip member;

a housing and bar follower, the housing having means mounting the bar follower consisting of first and second parallel rollers, the first roller having a firm periphery for transversely supporting the bar that is extendable from the housing and has means extending through the housing, and the second roller having a rubberized periphery springily urging the bar against the first roller, and the second roller thereby rotating in response to the bar being extended or retracted with respect to the housing;

a potentiometer mounted on the housing and connected across a voltage source, and the potentiometer including a rotatable shaft coupled whereby the potentiometer responds electrically, with analog signals, to movements of the tip member, and the tip member and the housing including measurement contact surfaces, and zero and span distances between said contact surfaces synchronized with national measurement standards, and whereby the distances synchronized are representative of a zero non-linearity region of an electrical resistor element within said potentiometer; and calculator means electrically coupled to convert said analog signals to digital signals and mathematically specify units of measurements and portions thereof relative to the distances between said contact surfaces when the tip member is extended or retracted, and the calculator means including digital read-out means displaying said units of measurements and portions thereof.

13. The device of claim 12 wherein the first roller includes flange members to guide the sides of the bar, and the second roller is reduced at its periphery to a contact surface with the bar generally along the longitudinal center of the bar.

14. The device of claim 12 wherein the first roller includes flange members to guide the sides of the bar.

15. The device of claim 12 wherein the rotatable shaft is axially coupled with reducing gears, and whereby at least one of said reducing gears is an anti-backlash gear, and whereby the reducing gears, in turn, are axially coupled with the second roller.

16. The device of claim 12 wherein the rotatable shaft is axially connected with the second roller.

17. The device of claim 12 wherein the calculator includes means dividing the voltage of said analog signals into a plurality of voltages representative of a plurality of measuring systems, and the housing mounting a selector switch electrically connected with said calculator means, and the switch having a plurality of independent selections representative of said measuring systems.

18. The device of claim 17 further including a bar stop mounted on the housing and having means locking the bar at any extendable position.

* * * * *